United States Patent [19]
Kurtz et al.

[11] 4,236,137
[45] Nov. 25, 1980

[54] SEMICONDUCTOR TRANSDUCERS EMPLOYING FLEXURE FRAMES

[75] Inventors: Anthony D. Kurtz, Englewood; Joseph R. Mallon, Franklin Lakes; Timothy A. Nunn, Ridgewood, all of N.J.

[73] Assignee: Kulite Semiconductor Products, Inc., Ridgefield, N.J.

[21] Appl. No.: 21,960

[22] Filed: Mar. 19, 1979

[51] Int. Cl.³ .............................................. G01L 1/22
[52] U.S. Cl. ......................................... 338/4; 338/5
[58] Field of Search .................. 338/4, 5, 2, 3, 42; 73/720, 721, 726, 727, 715

[56] References Cited

U.S. PATENT DOCUMENTS

| 3,213,400 | 10/1965 | Gieb | 338/5 |
| 3,970,982 | 7/1976 | Kurtz et al. | 338/4 |
| 4,051,451 | 9/1977 | Kurtz et al. | 338/4 |

Primary Examiner—C. L. Albritton
Attorney, Agent, or Firm—Arthur L. Plevy

[57] ABSTRACT

A pressure transducer employs a semiconductor diaphragm with a top surface having located thereon a central boss area of a trapezoidal cross section surrounded or "framed" by a continuous groove of a predetermined width. Piezoresistive sensors are formed on the bottom surface of said diaphragm with a first sensor adjacent the outer edge of said groove and another sensor parallel to said first sensor and adjacent the inner edge of said groove, said groove operative as a stress concentrating area to enable said sensors to provide a relatively large linear output upon application of a force to said diaphragm.

23 Claims, 6 Drawing Figures

SEMICONDUCTOR TRANSDUCERS EMPLOYING FLEXURE FRAMES

BACKGROUND OF INVENTION

This invention relates to semiconductor transducers and more particularly to a transducer employing a rectangular flexure frame with piezoresistors diffused about said frame at locations suitable to monitor the magnitude of an applied force.

DESCRIPTION OF THE PRIOR ART

The semiconductor transducer has experienced widespread utility in a variety of devices. There has been a great deal of research involved in increasing the efficiency and operation of semiconductor transducers and mainly, such devices employing piezoresistive sensors. As the technology progresses, the devices have continuously been made smaller, more reliable with increased output and with increased efficiency. A typical transducer employs a relatively circular diaphragm having diffused or located thereon, piezoresistive devices. Many diaphragms employed in the prior art are of a uniform cross section and as indicated, are circular in configuration.

Typical prior art transducers employing such diaphragms as well as their construction and operation are described in U.S. Pat. No. 3,654,579 entitled ELECTROMECHANICAL TRANSDUCERS AND HOUSINGS by Anthony D. Kurtz et al. issued on Apr. 4, 1972. Various other devices fabricated by different techniques are depicted and shown in U.S. Pat. No. 3,800,264 by Anthony D. Kurtz et al. issued on Mar. 26, 1974.

In these circular prior art diaphragms, the stresses are provided by applied forces, are widely distributed over the surface of the diaphragm and are not concentrated in any significant degree. Hence, the outputs of such diaphragms are more or less predetermined. It is, of course, a desire of a transducer manufacturer to produce a given device which preferably should occupy a small amount of space and to provide a relatively large output. This is particularly desirable in the fabrication of low pressure transducers, as one would desire as large an output signal as possible in order to discriminate against noise.

In regard to the prior art diaphragms of a circular configuration, the manufacturers tend to decrease the thickness of the diaphragm in order to cause it to respond to low magnitude pressures. A difficulty with this approach is that as the diaphragm was made thin and consequently less stiff, it would be subjected to external factors which would cause diaphragm stresses due to temperature and so on and hence, cause undesirable output signals. Thus, it would be the desire of a manufacturer to provide a stiffer diaphragm device and to achieve a large output, while avoiding the problem of undue diaphragm stresses.

A further difficulty arises when a thin sensor is fabricated in the form of a conventional diaphragm in order to obtain increased output. It is found that nonlinearities occur in the output due to the presence of nonlinear membrance stresses present on the surface of the diaphragm. This is particularly true for low pressure devices. This nonlinearity is related to the stiffness of the diaphragm. Stiffer diaphragms have a stress pattern which is primarily one of the linear bending stresses, while thin diaphragms have substantial nonlinear membrane stresses. The present invention employs a relatively stiff diaphragm because of the thick central boss, while allowing high output due to the placement of the sensors over the thin picture frame section. This approach allows the fabrication of high output, low pressure sensors with substantially linear outputs.

A basic approach employed in the prior art was to fabricate a diaphragm having areas of reduced thickness and areas of increased thickness. In this manner, flexure areas were provided which tended to concentrate the stress at the flexure points. Accordingly, if one then bonded or diffused sensors about these flexure areas, the sensors would be subjected to higher stress levels. Thus, such devices provided higher output levels. Examples of such transducers which employed various cross section diaphragms can be had by referring to the following patents:

U.S. Pat. No. Re. 25,294 originally U.S. Pat. No. 3,071,745 issued on Jan. 1, 1963 to C. K. Stedman depicts a diaphragm of nonuniform cross section which essentially is circular in configuration.

U.S. Pat. No. 3,277,698 issued on Oct. 11, 1966 entitled STRESS SENSING SEMICONDUCTIVE DEVICES by Mason also shows a diaphragm of a nonuniform cross section and employed in an accelerometer device.

U.S. Pat. No. 3,393,566 issued on July 23, 1968 entitled MINIATURE PRESSURE TRANSDUCER by Green shows a low pressure device which employs a diaphragm of nonuniform cross section. The device depicted affords stress magnification between the axial thrust of the diaphragm and the reactive stresses experienced by the gages or sensors coupled thereto.

Many other patents in the prior art such as U.S. Pat. No. 3,625,116 entitled PRESSURE SENSING DIAPHRAGM depicted contoured diaphragms of nonuniform cross section particularly adapted for various application.

Still other patents such as U.S. Pat. No. 4,065,970 entitled DIFFUSED SEMICONDUCTOR PRESSURE GAUGE issued on Jan. 3, 1978 to Wilner show a diaphragm wherein a surface of the diaphragm is etched to provide narrow flexure areas between thick areas in the form of central islands. This device incorporates a plurality of such islands which are surrounded by thin flexure areas. Other patents as U.S. Pat. No. 4,093,933 depict similar diaphragms employing a plurality of raised areas or islands surrounded by thin flexure areas.

As indicated, the main purpose of the prior art devices is to provide stress concentration at the flexure areas to enable one to achieve higher outputs, while circumventing the above described problems associated with the circular diaphragm. Certain of the prior art devices are relatively difficult to fabricate and require extremely accurate positioning of the transducers within the flexures fabricated. The devices of the prior art are typically circular in configuration and employ tortuous flexure paths and hence, require multistep procedures in the fabrication of such devices.

Transducer structures are often fabricated using layers of materials with varying thermal expansion coefficients. For instance, silicon dioxide is often formed at elevated temperatures on the surface of a silicon diaphragm to serve as a diffusion masking and passivation layer. Typically this layer will prestress the diaphragm at zero pressure and thus cause an undesirable signal.

This has been found to be particularly true of prior art devices employing grooves or slots. Devices of the present invention are found to be essentially flat when fabricated by the same techniques.

The structure of the present application is of a form that is conveniently adapted to an overpressure stop. Typically, such a stop is formed by either forming a shallow depression in a semiconductor wafer which also forms the diaphragm, or forming a shallow depression in a backing plate which supports the diaphragm.

In either case, if one employs a thin diaphragm, then a thin semiconductor wafer must be employed. Such wafers are extremely fragile and difficult to handle and thus expensive to fabricate. In the present invention, the presence of the central boss provides a convenient surface for stopping, while allowing the semiconductor wafer to be relatively thick and still giving high output at low pressures. The stop is fabricated by etching or otherwise forming a shallow depression in a backing plate which allows limited travel of the diaphragm.

It is therefore an object of the present invention to provide an improved transducer device which employs a single central area surrounded by a rectangular flexure groove or channel. The device to be described exhibits a stress pattern of opposite algebraic signs on opposite sides of the groove to enable the detection of tension and compression about the groove in a simple and reliable manner. The device depicted is readily fabricated, while providing relatively high output signals and hence, avoiding many of the problems associated with prior art devices.

BRIEF DESCRIPTION OF THE PREFERRED EMBODIMENT

A pressure transducer comprises a semiconductor diaphragm with a top surface having a relatively main central area surrounded by a continuous groove of a predetermined width and depth, a first piezoresistive sensor mounted on said bottom surface and located adjacent the outer edge of said groove, and at least a second piezoresistive sensor mounted on said bottom surface and located adjacent the inner edge of said groove, whereby when a force is applied relatively transverse to said bottom surface, said first sensor is in tension and said second sensor is in compression.

DETAILED DESCRIPTION OF THE INVENTION

Figure 1:
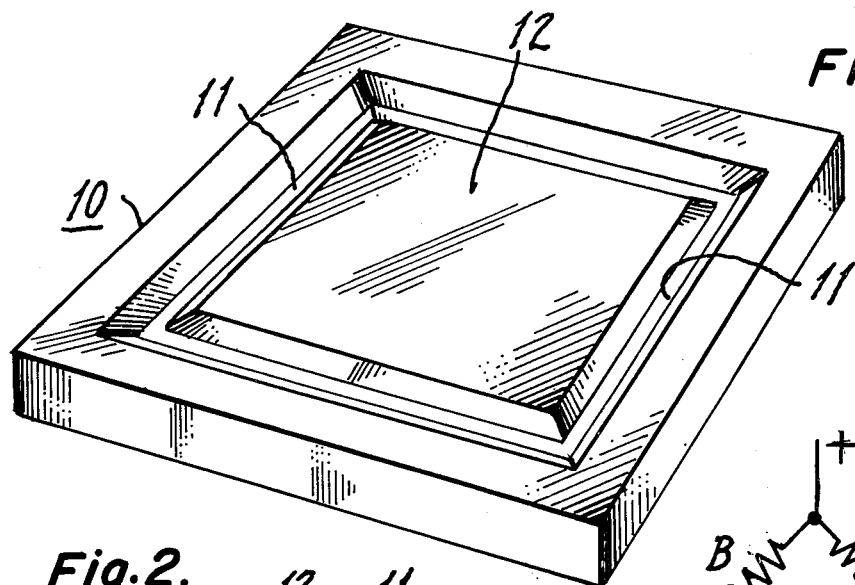
FIG. 1 is a perspective view of a transducer diaphragm according to this invention.

Referring to FIG. 1, there is shown a perspective view of a transducer according to this invention. A diaphragm 10 is rectangular or square in configuration and has located on a top surface thereof, a narrow groove 11 which surrounds a central boss or rigid area 12. As will be explained, the groove 11 is formed by a semiconductor etching process and essentially, has the appearance of a picture frame which completely surrounds the boss 12.

At the onset, it is noted that the device depicted in FIG. 1 is extremely small and for example, the length of a typical side may be about 0.08″. The device depicted in FIG. 1 is fabricated from silicon or another suitable semiconductor material and is approximately 0.005″ thick.

Figure 2:
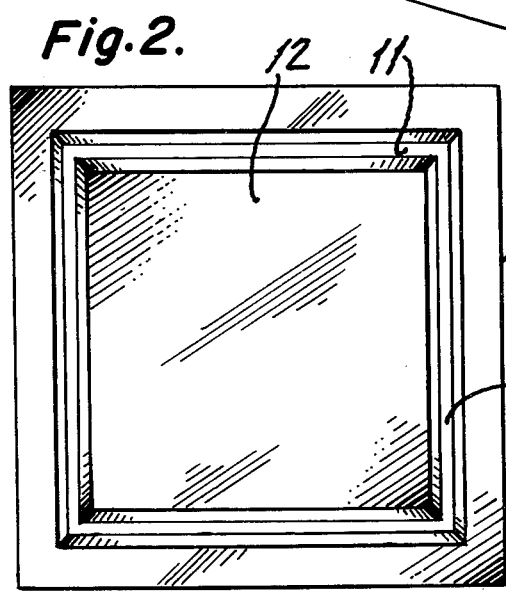
FIG. 2 is a top plan view of a transducer according to this invention.

FIG. 2 is a top view of the device shown in FIG. 1. Essentially, the central boss 12 is trapezoidal in cross section and has sharp edges connected by a relatively straight side. The picture frame or rectangular groove 11 is contiguous with one side of the central boss 12 and surrounds the same.

As indicated, the square geometry of the device renders it relatively stiff in regard to forces which are in a direction parallel to the edges of the boss. Hence, as seen the diaphragm does not bend easily for forces which are parallel to the straight edges of the diaphragm, but will exhibit deflection for forces which are relatively transverse to the edges.

Figure 3:
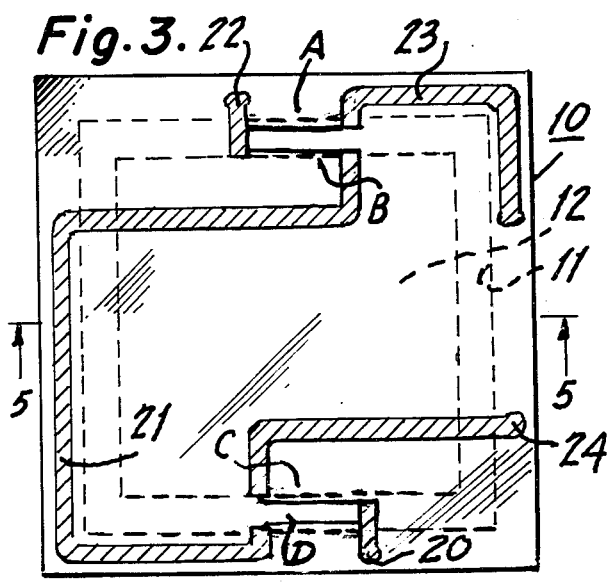
FIG. 3 is a bottom plan view of the transducer of FIG. 2.

FIG. 3 shows a bottom view of the device of FIG. 1. As seen from FIG. 3, the groove 11 shown in dashed line and two sensors A and D located on the outer periphery or the outer edge of the groove 11 but on the bottom of the diaphragm are visible in the bottom view. Additionally, two sensors B and C are located on the inner edge of the groove 11. It is noted that the bottom surface of the rectangular wafer 10 is relatively smooth and hence, is adapted for diffusion or deposition of piezoresistive devices thereon.

It is noted that the sensors are positioned relatively parallel to the respective edges and slightly within the groove. The sensors are practically aligned with the outer edge of the groove 11 for maximum response to stress as formed about the groove 11. A plurality of conductors are positioned between the sensors to provide suitable terminals for the fabrication of a typical bridge circuit which is extremely useful in transducer operation.

Thus, as seen from FIG. 3, the sensors C and D are connected to a common terminal 20 through a metalized and/or diffused terminal area. The other end of sensor D is coupled through a metallic path 21 to one terminal of sensor B. The other terminal of sensor B is coupled to a terminal of sensor A via metalized area 22. A terminal of both sensors A and C are respectively coupled to output terminal areas 23 and 24.

Figure 4:
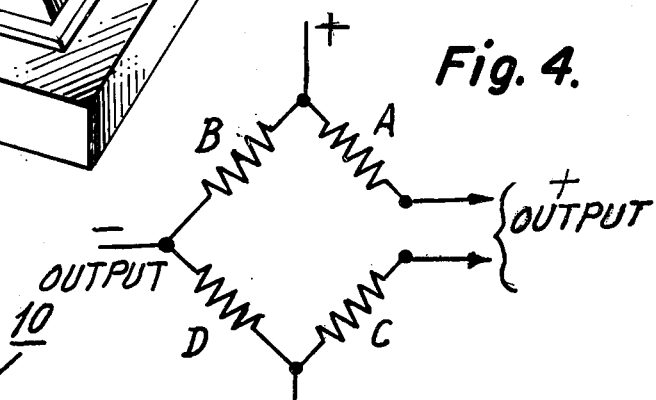
FIG. 4 is a schematic diagram of the transducer structure.

The electrical schematic of the sensors are shown in FIG. 4. As can be seen from FIG. 4, the configuration afforded by the above noted connection is relatively universal and can be arranged as a conventional Wheatstone bridge. One, of course, has access to the above noted terminals and hence, can provide for external compensation or coupling to external devices for monitoring pressure as applied to the diaphragm 12.

Figure 5:
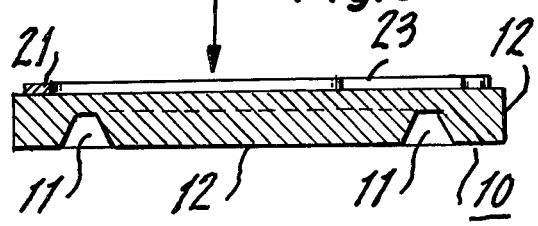
FIG. 5 is a cross-sectional view taken through line 5—5 of FIG. 3.

Referring to FIG. 5, there is shown a cross-sectional view of the diaphragm 12 taken through line 5—5 of FIG. 3. As indicated, the diaphragm has a main central area 12 which is trapezoidal in cross-section. The base angles of the trapezoid are approximately forty-five degrees; which angle is afforded by the etching technique. The groove 11 has sloped sides and is of a truncated V configuration.

If a force F is applied as shown in FIG. 5, sensor A will be subjected to tension, sensor B to compression. In a similar manner, sensor C will be in compression, while sensor D will be in tension.

Hence, as seen the sensors on the outside edge of the slot 11 such as A and D are in tension, while the sensors on the inside edge of the groove 11 are in compression. In this manner, a pair of sensors such as A and B are subjected to a biaxial stress developed about the groove 11. The stress concentration about the groove 11 is extremely high and exceeds any stress concentration which may be dispersed throughout the remaining portions of the diaphragm.

The gages A and B and gages C and D are separated one from the other relatively by the width of the groove 11. In this manner, the gages are extremely close together as will be explained, and hence, one obtains relatively uniform temperature tracking of the gages and closer resistance matching due to the fact that they are very close in proximity to each other on the wafer.

The diaphragm, being square in configuration, enables easy handling due to the square edge, while providing a relatively rigid structure which due to its geometrical shape, discriminates against bending due to forces parallel to the straight edges of the diaphragm.

The fabrication of such devices as depicted in FIGS. 1 through 5 will now be briefly described, as the above configuration and structure enables one to employ high diffusion processing techniques with great ease.

Before discussing suitable fabrication techniques for the devices depicted above, it is believed a brief description of the type of sensors that can be employed with the apparatus is warranted. At the onset, it is indicated that the sensors such as A through D are preferably transverse gages. Normally, it is difficult to employ transverse gages in conventional diaphragms due to the fact that longitudinal forces are always also present. In any event, transverse gages are easy to fabricate and can be squeezed into the edge of the device. It is indicated that while transverse gages are preferred, one can employ longitudinal gages as well and they will operate accordingly. The transverse gage, when positioned about the groove 11 as shown in the FIGS. will give a large output due to the fact that they can be effectively positioned at the edges where the maximum stress occurs.

Most semiconductor strain gage transducers in the prior art rely almost exclusively on the longitudinal piezoresistive effect. Essentially, a sensor is referred to as longitudinal if the major length of the sensor is parallel to the stress axis. In a similar manner, a sensor is referred to as a transverse sensor when its major length is normal or transverse to the stress axis.

The equations defining longitudinal operation and transverse operation are fairly well known in the prior art and reference is made to a paper entitled SEMICONDUCTOR TRANSDUCERS USING TRANSVERSE AND SHEAR PIEZORESISTANCE by Anthony D. Kurtz et al. and appearing in Application Note KPSAN-10 published by Kulite Semiconductor Products, Inc. The paper further describes the fabrication of sensors which are optimum for response to either transverse or longitudinal stresses.

In the fabrication of such devices, a silicon wafer or chip 10 is normally oxidized and a photoresist is imaged on the top surface thereof. A mask is employed which has an opaque image corresponding to the dimensions of the groove. Once the image is formed, the area within the groove 11 is exposed for etching. One then employs an anisotropic etch to etch the groove. This etching process is well known and enables one to provide a groove 11 with extremely sharp edges and sides to enable effective stress concentration at the periphery. Known etchants for the silicon are alkaline etches or acid etches and techniques for etching the same are quite well known.

The etching rate is also ascertained and hence, the groove in this particular example is etched to a depth of about 0.003" deep. The groove, as indicated, is approximately 14.2 mils wide at the top and about 10 mils wide at the bottom with the sides of the groove sloping therebetween and being relatively straight due to the etching technique.

The etching of the groove 11 thus forms the central trapezoidal area 12. It is noted that the groove can be 10 mils at the bottom portion which will approximately indicate a top width of about 14.2 mils, due to the etching constraints associated with silicon etching. The silicon may be n type silicon of the single crystal type. Once the pattern of the groove is etched on the top surface of the chip, the sensor and terminal assemblies are formed on the bottom surface as shown in FIG. 3.

It is understood that there are various methods for obtaining a sensor network on a momolithic body. One can deposit piezoresistive sensors employing P-N junction isolation using solid state diffusion and oxide masking, or one can fabricate such sensors by dielectric isolation using silicon dioxide as the dielectric and epitaxially grown silicon as the monolithic structure. The advantages of using the P-N junction technique is that it is easier to fabricate, while one can obtain extra dimensional control. Of course, other sensor fabrication techniques such as sputtering or evaporating metallic or semiconductor sensors can also be employed. Using such techniques, resistive line widths on the order of 0.0001" can be obtained and junction depths as low as one micron are readily achieved.

Various processes, of course, have their advantages and disadvantages. Essentially, the techniques of depositing transverse or longitudinal piezoresistors in conjunction with terminal and metalized areas are described in the above noted Application Note and are well known in semiconductor and thin film technology.

In any event, it is again indicated that it is preferable to employ transverse sensors in regard to techniques described herein. With such sensors, one obtains more linearity with a relatively high output. Longitudinal sensors are also suitable and hence, the invention is not to be constrained to the transverse device.

Dimensions of a typical device will now be given. Referring to FIG. 1, a device was fabricated which was about 0.087" in width and length. The height of the semiconductor chip 12 was approximately 0.0035" with a notch having a top width of approximately 14.2 mils extending downward into the chip a distance of approximately 3 mils with a bottom dimension of approximately 10 mils. The central portion 12 was approximately 0.042" in length and width and is of a relatively rectangular configuration.

It is, of course, understood that the groove width of 10 mils or thereabouts is relatively large and it is anticipated that groove widths of 15 mils or those of 5 mils would suffice as well. It is understood that the width of the groove is to be considered with the dimensions of the chip and hence, larger or smaller widths may be employed as the dimension of the chip are increased or decreased.

Hence, as can be ascertained, the device is extremely small, but provides a significant increase in output level over a conventional device employing a circular diaphragm of uniform cross section.

It is, of course, understood that a plurality of such devices as depicted in FIG. 1 can be fabricated simultaneously on a large silicon wafer by conventional semiconductor processing techniques and individual devices can be then cut or scribed to provide a plurality of individual elements.

The device shown in FIG. 1 can be bonded by many techniques to a suitable housing which may be cup-shaped with wires directed to the terminal areas and through the housing. Many examples of suitable housings and bonding techniques for such housings are known in the prior art and many patents which are assigned to the assignee herein such as U.S. Pat. Nos. 3,654,579, U.S. 3,748,571, U.S. 3,800,264, U.S. 3,739,315 and so on show suitable housings and lead arrangements which can be employed in conjunction with the transducer structure depicted.

Figure 6:
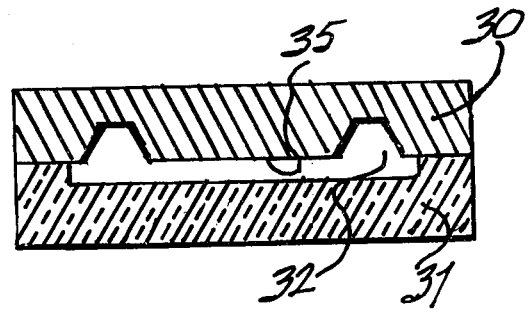
FIG. 6 is a cross-sectional view of a transducer employing a stopping plate.

Referring to FIG. 6, there is shown the "picture" frame transducer 30 bonded to a stopping member 31. The member 31 may be fabricated from glass or a semiconductor and has a central recess or depression which is etched or otherwise formed in member 31 and is larger than the central boss or central trapezoidal area 35 of the transducer 31.

As can be seen from FIG. 6, the depression 32 formed in the stopping member allows the central portion 35 to deflect a predetermined amount. When it contacts the surface of member 31, it is stopped or restrained from further deflection. The depth of the shallow depression for example, can be 0.0002" thick and will allow the diaphragm to deflect that distance and stop the diaphragm from further deflection. In this manner, the stopping member 31 acts as an overpressure control to thus prevent rupture or breakage of the diaphragm upon application of excessive forces. It is extremely advantageous to use such stops in conjunction with diaphragms as depicted in FIG. 6.

As indicated, the stopping member or plate 31 may be fabricated from glass or a semiconductor material. The member 31 is bonded to member 30 by means of a diffusion bond, or a glass bond, or by means of employing a suitable epoxy or other bonding agent. The depression 32 is positioned so that the central area is surrounded thereby to enable deflection of the diaphragm as indicated.

Many modifications and alternatives will become apparent to those skilled in the prior art upon reading this specification and are deemed to be within the scope and breadth of this invention.

We claim:

1. A pressure transducer, comprising:
   (a) a diaphragm with a top surface having a relatively large main central area of a relatively uniform thickness surrounded by a thin continuous groove of a predetermined width and depth,
   (b) first and second piezoresistive sensors mounted on said bottom surface and each positioned parallel to a respective edge of said groove and directly adjacent one another separated relatively by the width of said groove on said top surface, whereby when a force is applied to said top surface, one of said sensors is subjected to compression while said other is in tension.

2. The transducer according to claim 1, wherein said diaphragm is relatively rectangular with said central area of a rectangular configuration surrounded by a rectangular continuous groove.

3. A pressure transducer, comprising:
   (a) a rectangular planar member fabricated from a semiconductor material and with a top surface having a main rectangular central area of a trapezoidal cross-section, said central area surrounded by a continuous rectangular groove of a predetermined depth, said groove being of a truncated "V" shaped cross-section with the inner wall of said groove contiguous with the sides of said central area, said planar member having a relatively smooth bottom surface opposite said top surface,
   (b) a first piezoresistive sensor located on said bottom surface and aligned parallel to a side of said groove and spaced from the outer edge of said side by a predetermined distance, a second piezoresistive sensor located directly adjacent said first sensor and spaced from the inner edge of said groove by said predetermined distance, whereby said first and second sensors are separated one from the other by the effective width of said groove.

4. The transducer according to claim 2 further including:
   (a) a third piezoresistive sensor located on said bottom surface and adjacent the outer edge of said rectangular slot at a side opposite to the side location of said first sensor, and a fourth sensor located adjacent said third sensor at the outer edge of said opposite side.

5. The transducer according to claim 1 wherein said central area is trapezoidal in cross section.

6. The transducer according to claim 1 wherein said groove is of a truncated "V" cross-sectional configuration being wider at the top surface of said diaphragm and narrower towards said bottom surface.

7. The transducer according to claim 1 wherein said piezoresistive sensors are of a configuration adapted to respond in a transverse mode.

8. The transducer according to claim 1 wherein said piezoresistive sensors are a configuration adapted to respond in a longitudinal mode.

9. The transducer according to claim 1 wherein said groove is manifested by an anisotropic etching technique.

10. The transducer according to claim 1 wherein said diaphragm is fabricated from silicon.

11. A diaphragm for a pressure transducer which comprises:
    a rectangular planar semiconductor member having a central rectangular area on a top surface surrounded by a continuous rectangular groove of a predetermined width and depth, with a relatively smooth bottom surface opposite said top surface, said bottom adapted to have diffused therein, piezoresistive sensors.

12. The diaphragm according to claim 11 wherein said central rectangular area is of a trapezoidal cross-section.

13. The diaphragm according to claim 11 wherein said groove is of a truncated "V" cross-section, with said groove being wider at said top surface and narrower towards said bottom surface, with the edges of said trapezoidal cross-sectional central area contiguous with the inner sidewall of said groove.

14. A pressure transducer, comprising:

(a) a semiconductor diaphragm with a top surface having a relatively main central area surrounded by a continuous groove of a predetermined width and depth.
(b) a first piezoresistive sensor mounted on said bottom surface and located adjacent the outer edge of said groove, a second piezoresistive sensor located on said bottom surface and parallel to said first sensor and positioned directly opposite said first sensor adjacent the inner edge of said groove with the relative width of said groove separating said first and second sensors, to cause said first sensor to be in tension and said second sensor to be in compression when a force is applied relatively transverse to said bottom surface.

15. The transducer according to claim 14 wherein said semiconductor diaphragm is relatively rectangular in configuration with said main central area of a rectangular configuration surrounded by a rectangular continuous groove.

16. The transducer according to claim 15 further including:
a third piezoresistive sensor located on said bottom surface and adjacent the outer edge of said slot at a side opposite to the side location of said first sensor and a fourth sensor located adjacent said third sensor at the outer edge of said opposite side.

17. The transducer according to claim 14 wherein said central area is trapezoidal in cross-section, with said groove being a truncated "V" cross-sectional configuration.

18. The transducer according to claim 14 wherein said piezoresistive sensors are of a configuration adapted to respond in a transverse mode.

19. The transducer according to claim 14 wherein said piezoresistive sensors are of a configuration adapted to respond in a longitudinal mode.

20. The transducer according to claim 14 wherein said diaphragm is fabricated from silicon and said groove is formed by an anisotropic etching technique.

21. The transducer according to claim 3, further comprising:
third and fourth sensors located on said bottom surface and aligned parallel to an opposite side of said groove, with said third and fourth sensors adjacent one another and separated as said first and second sensors by the effective width of said groove.

22. The pressure transducer according to claim 21 further including a stopping member having a central depression slightly larger than said central area of said planar member, said stopping member bonded to said planar member with said central area facing said depression, said depression being of a predetermined depth to act as a stop by coacting with said central area of said planar member for forces applied to said transducer in excess of a predetermined level.

23. The transducer according to claim 22 wherein said stopping member is fabricated from glass and is bonded to said planar member by means of a diffusion bond.

* * * * *